United States Patent [19]

O'Meara

[11] Patent Number: 4,573,157

[45] Date of Patent: Feb. 25, 1986

[54] PHASE-CONJUGATE RESONATOR WITH A DOUBLE SBS MIRROR

[75] Inventor: Thomas R. O'Meara, Malibu, Calif.

[73] Assignee: The United States of America as represented by the Secretary of the Air Force, Washington, D.C.

[21] Appl. No.: 559,613

[22] Filed: Dec. 8, 1983

[51] Int. Cl.[4] .............................................. H01S 3/098
[52] U.S. Cl. ........................................ 372/19; 372/20; 372/102
[58] Field of Search ...................... 372/20, 19, 99, 102; 307/426

[56] References Cited

U.S. PATENT DOCUMENTS

| | | | |
|---|---|---|---|
| 3,617,927 | 11/1971 | Pohl | 331/94.5 |
| 3,940,713 | 2/1976 | Hughes | 331/94.5 C |
| 4,005,935 | 2/1977 | Wang | 356/5 |
| 4,087,764 | 5/1978 | Young | 372/20 |
| 4,233,571 | 11/1980 | Wang et al. | 331/94.5 C |
| 4,264,877 | 4/1981 | Grischkowsky et al. | 372/20 |
| 4,276,519 | 6/1981 | Marteau | 331/94.5 C |
| 4,399,540 | 8/1983 | Bücher | 372/20 |

OTHER PUBLICATIONS

Yariv et al., "Amplified Reflection, Phase Conjugation, and Oscillation in Degenerate Four-Wave Mixing" *Optics Letters*, Jul. 1977, pp. 16 to 18.
Wang et al., "Correction of Phase Aberrations Via Stimulated Brillouin Scattering", *Optics Letters*, vol. 2, Jan. 1978, pp. 61–63.

*Primary Examiner*—William L. Sikes
*Assistant Examiner*—Robert E. Wise
*Attorney, Agent, or Firm*—Donald J. Singer; Stanton E. Collier

[57] ABSTRACT

A laser using a stimulated Brillouin scattering (SBS) mirror and a moving grating eliminates frequency walkoff of the reflected beams. A laser using a double-SBS mirror prevents frequency walkoff by having the other side of the SBS mirror act as a conjugate moving grating.

9 Claims, 3 Drawing Figures

PHASE-CONJUGATE RESONATOR WITH A DOUBLE SBS MIRROR

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to lasers and, more particularly, to a laser resonator which corrects distortion in the wavefronts and frequency walkoff.

The optical elements of the laser resonator determine the spatial coherency of the laser beam which directly affects propagation and focusing capabilities. Some of the problems associated with the laser beam formation are vibration of reflecting surfaces, misalignment, aberrations in the lasing medium, index inhomogeneties, etc.

Prior art solutions to these problems require a high degree of accuracy in the optical components used (typically fabrication accuracy to $\lambda/10$ or better), and mechanically stable oscillator cavities with low Fresnel numbers (typically $a^2\lambda L \sim 1$). A mode-selecting aperture is conventionally used to select the lowest order transverse mode when optimum spatial coherence and beam propagation are desired. Accurate alignment of the focusing elements, such as the cavity mirrors, aperture, and the like is critical in the conventional laser resonator. A large mode diameter is generally desirable to achieve efficient extraction of laser energy using conventional plane or curved mirror laser resonators. This can be achieved only at the expense of even more stringent optical quality, alignment and lasing medium uniformity.

Another approach for producing a large mode diameter while providing better performance involves the use of a spatial filter. This requires placing two lenses and a pinhole aperture within the laser cavity in the beam path. However, the disadvantages of this approach include additional elements which must be aligned, the same great sensitivity to optical aberrations of the medium or the optical elements, and the resultant loss of power upon the aperture. An additional difficulty is that high power operation is precluded by laserinduced breakdown at the aperture due to the presence of a tightly focused beam and high power density.

Prior attempts to correct unavoidable aberrations of the medium or optics have utilized a correction device external to the laser cavity. Two examples are the mechanically deformable mirror described in U.S. Pat. No. 3,731,103, and the technique of U.S. Pat. No. 4,005,935.

More recently several attempts have succeeded in correcting phase front distortions in a laser cavity by using the mechanically deformable mirror inside a laser cavity. This technique is described in "Experimental Studies of Adaptive Laser Resonator Techniques", R. R. Stevens and R. C. Lind, with anticipated publication in Optics Letters, and "Adaptive Laser Resonator", R. H. Freeman et al, Opt. Lett., Vol. 2, No. 3, March 1978.

Drawbacks of this type of system include slow response times, need for external beam sampling to provide a feedback loop for the mechanical mirror servo system, and general system complexity resulting in high system cost and lower reliability.

One solution to the above problem is the use of a nonlinear phase conjugation device called a stimulated Brillouin scattering (SBS) device within the laser resonator cavity. The SBS device corrects for distortions in the wavefronts of the laser beam by reflecting the complex phase conjugate image of the distorted incident optical wavefront. When the reflected wave encounters the abnormality which initially caused the distortion, because it is the phase conjugate image of the distorted wave, it interacts with the abnormalities to form a plane wave. But each reflection off of the SBS device shifts the wavelength at the reflected signal as a consequence of the moving grating. This frequency shift is typically hundreds of megahertz and accumulates progressively with each reflection off of the SBS device. As a consequence, within a few iterations the frequency of the reflected wave "walks away" from the gain region. Bandwidth of the laser medium and efficient energy extraction comes to a halt. Thus, a long-pulse mode requiring many successive reflections becomes very difficult to obtain, if not impossible.

These drawbacks have motivated a search for an improved laser resonator having an SBS device therein.

SUMMARY OF THE INVENTION

The present invention is directed toward providing an improved phase-conjugate resonator in which the above undesirable characteristics are minimized or eliminated.

The present invention employs two moving grating devices as feedback mirrors at both ends of the resonator together with a spatial filter, an output coupler, and a laser gain medium. In particular, at least one of the moving gratings is a Brillouin (SBS) mirror and in some arrangements both gratings may be.

It is therefore one object of the present invention to provide for an improved phase-conjugate resonator that eliminates doppler walkoff.

Another object of the present invention is to provide for a resonator that can operate in a long-pulse mode without doppler walkoff.

These and many other objects and advantages of the present invention will be readily apparent to one skilled in the pertinent art from the following detailed description of a preferred embodiment of the invention and related drawings.

DETAILED DESCRIPTION OF THE PREFERRED EMBODIMENT

The multipass character of laser resonators greatly enhances the distortion potential of intracavity perturbations. Similarly, the effects of mirror alignments is greatly accentuated compared to extracavity optical systems. Further, the combined resulting intracavity errors may sometimes have a very high spatial frequency content. Nonlinear phase conjugation offers excellent capability for correcting spatial frequency distortion as contrasted with conventional adaptive optics with deformable mirrors.

Figure 1:
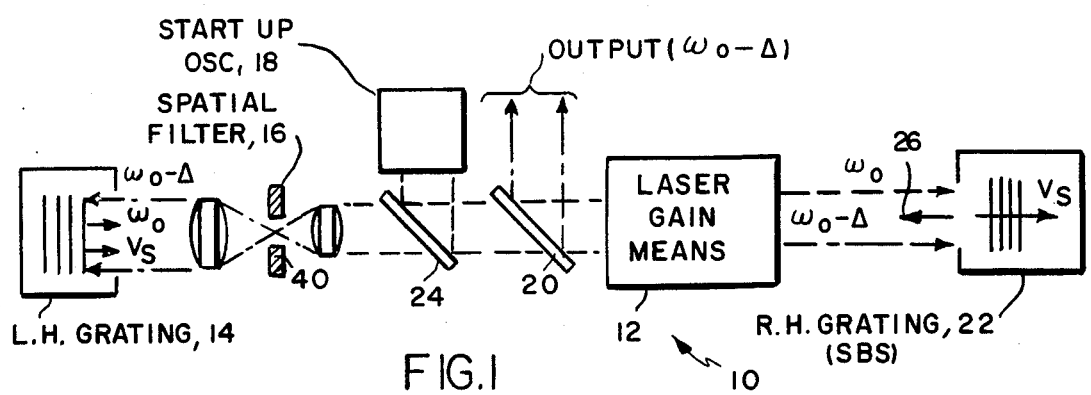
FIG. 1 is a schematic representation of a double-grating SBS resonator of the present invention.

Referring to FIG. 1, improved laser resonator 10 as shown has therein a laser gain means 12, a left-hand (LH) grating means 14, a spatial filter 16, a start-up oscillator 18, an output coupler 20, and a right-hand (RH) grating means such as a stimulated Brillouin scattering (SBS) mirror 22, not shown in any greater detail. The support structure to hold the above components is not shown.

Improved laser resonator 10 employs conventional lasing material in laser gain means 12. Excitation of laser gain means 12 is also by conventional means, not shown, such as an RF source, a flashlamp, etc.

Output coupler 20 is shown as a beamsplitter, but other means are available to remove the laser energy from resonator 10. Start-up oscillator 18 initiates a pulse of laser energy from resonator 10 and is coupled into laser gain means 12 by a beamsplitter 24. Spatial filter 16 is positioned in the optical axis near grating means 14, and allows only the fundamental mode of laser gain means 12 to pass through resonator 10.

As noted above, the use of only one SBS mirror 22 in resonator 10 for distortion correction leaves the problem of frequency walkoff as repeated iterations occur within resonator 10. This, of course, leads to a lower efficiency and eventually causes resonator 10 to stop operating. This doppler shift is of about 500 MHz at 1.3 $\mu$m for a gaseous medium in laser gain means 12.

This frequency walkoff can be eliminated by employing a moving grating means 14 opposite SBS mirror 22 in resonator 10. Grating means 14 should have the same spacing and velocity as SBS mirror 22. If SBS mirror 22 is moving to the right, the frequency of a reflected laser beam 26 is decreased an amount, $\Delta$, equal to the doppler shift, and the resulting frequency is equal to $\omega_o - \Delta$. If SBS mirror is moving to the left, the frequency is $\omega_o + \Delta$. Because lasers have a gain bandwidth normally less than $2\Delta$, the amount of gain would be unequal in the two directions. To achieve greater efficiency, resonator 10 is designed so that the reflected laser beam 26 frequency of $\omega_o - \Delta$ is in the center of the gain-frequency profile of laser gain means 12. This selection allows only pulses to occur when both LH grating means 14 and SBS mirror 22 are moving to the right. Clearly, the opposite direction is possible if the center frequency of gain means 12 is changed. Further, if one can decrease the doppler shift, $\Delta$, to be within the gain bandwidth of gain means 12 an increase in the bandwidth operation can occur in both directions. LH grating means 14 can be an acousto-optic cell synchronously driven with SBS mirror 22.

Figure 2:
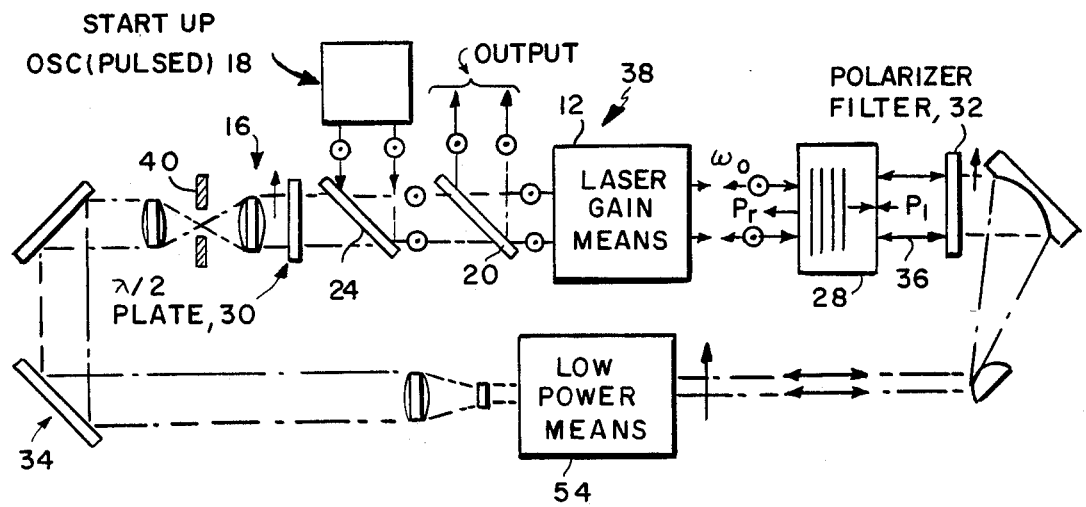
FIG. 2 is a schematic representation of a double-SBS-mirror resonator of the present invention.

Another embodiment is shown in FIG. 2 where the LH grating means 14 is combined with SBS mirror 22 so that SBS mirror 22 induced grating from the backside acts as a surrogate left-hand grating means 14.

In order not to form a double grating, incident power going to right onto double SBS mirror 28, $P_r$, must be greater than incident power going to the left onto double SBS mirror 28, $P_L$ by the following factor:

$$P_r > 5 P_L \quad (1)$$

$P_r$ must exceed the SBS threshold and $P_L$ must fall well below it. If $P_L$ exceeds the SBS threshold, then a second grating is formed which advances away from the incident field thus producing a frequency shift in the wrong direction.

Given that $P_r$ must exceed $P_L$, a residual transmission of a $P_r$ beam could dominate the reflected LH beam 36, and since such a feedthrough does not have the appropriate frequency shift for doppler compensation, the transmitted $P_r$ is eliminated by polarization rotation means of polarizer filter 32 and $\lambda/2$ plate 30.

A short pulse, about 10 nsec, is used to initiate resonator 10 on a double SBS mirror resonator 38. This pulse must cause the initial $P_r$ to exceed the SBS threshold.

A wide-bandwidth, low-power amplifier 54 may be located in LH optical train 34 to provide additional gain for rapid start-up with pulse operation of the system.

Double SBS mirror resonator 38 is a low average power system, but higher power is obtainable if reflective optics and grating equivalents are used.

Figure 3:
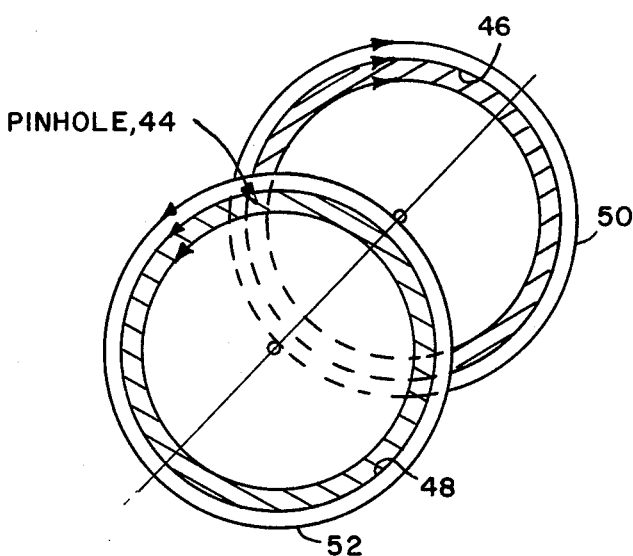
FIG. 3 is a schematic representation of a rotary pinhole system used in the spatial filter of the present invention.

Clearly, with short-focal-length pinhole systems which were employed in FIGS. 1 and 2, a stop 40 would not survive operation at high power levels and air breakdown at the focus would be a distinct possibility. The approach to be discussed employs two elements. First, the f/number of spatial filter 16 is kept high by employing small diameter optics ($\sim 0.5$ cm) and long (folded) paths ($\sim 20$ m). Stop 40 is then essentially in the far field of optics and diameters become about the same size ($\sim 0.3$ cm) as the input/output optics, which equalizes the power density loading. Second, the average power density loadings on these optical elements may be further lowered by using a rotating pinhole system 42. The use of a large f/number system gives a large depth of focus which permits a pinhole 44, FIG. 3, to be formed by the intersection of two annular slots 46 and 48 on two rotating wheels 50 and 52, respectively.

Appropriate drive means, not shown, are attached to wheels 50 and 52.

Clearly, many modifications and variations of the present invention are possible in light of the above teachings and it is therefore understood, that within the inventive scope of the inventive concept, the invention may be practiced otherwise than specifically claimed.

What is claimed:

1. A laser, said laser comprising:
   a stimulated Brillouin scattering mirror means for providing reflected radiant energy which is the phase conjugate of incident radiant energy on said SBS mirror means;
   laser gain means for providing said incident radiant energy in response to excitation energy;
   excitation means coupled to said laser gain means for exciting said laser gain means and inducing said laser gain means to output radiant energy;
   coupling means for outputing said reflected radiant energy from said laser gain means;
   a spatial filter for removing undesired lasing modes; and
   grating means for reflecting said reflected radiant energy, said grating means translating in unison with said SBS mirror means whereby a doppler shift in said reflected radiant energy incident on said grating means is substantially removed.

2. A laser as defined in claim 1, wherein said spatial filter includes a rotary pinhole system and optics having a high f/number.

3. A laser as defined in claim 2 wherein said rotary pinhole system further includes a first wheel and a second wheel, each of said wheels having an annular slot therethrough and centered on said wheel, said wheels being eccentrically mounted to each and driven whereby two pinholes are formed by the intersection of said annular slots, said radiant energy from said laser gain means passing therethrough.

4. A laser as defined in claim 1 wherein said grating means is an acoustic-optic device having therein a mirror-like surface for reflecting radiant energy to said spatial filter.

5. A laser, said laser comprising:

a double-stimulated Brillouin scattering (SBS) mirror means for providing a first reflected beam having a doppler shift therein and a second reflected beam having said doppler shift removed; said first reflected beam being the phase congugate of a first incident beam on said double-SBS mirror means;

laser gain means for providing said first incident beam in response to excitation energy;

excitation means coupled to said laser gain means for exciting said laser gain means and inducing said laser gain means to output said excitation energy;

coupling means for outputting said first reflected beam from said laser gain means;

a spatial filter for removing undesired lasing modes;

means for preventing said first incident beam on said double-SBS from being transmitted therethrough to interfere with said second reflected beam from said double-SBS mirror means; and beam bending means to cause said first reflected beam to be incident on the opposite side of said double-SBS mirror means.

6. A laser as defined in claim 5 wherein said spatial filter includes a rotary pinhole system and optics having a high f/number.

7. A laser as defined in claim 6 wherein said rotary pinhole system further includes a first wheel and a second wheel, each of said wheels having an annular slot therethrough and centered on said wheel, said wheels being eccentrically mounted to each and driven whereby two pinholes are formed by the intersection of said annular slots, said radiant energy from said laser gain means passing therethrough.

8. A laser as defined in claim 5 wherein said laser further comprises a low power amplifier.

9. A laser as defined in claim 5 wherein said means for preventing means includes for polarization and rotation.

* * * * *